US008519268B2

(12) United States Patent
Leipold et al.

(10) Patent No.: US 8,519,268 B2
(45) Date of Patent: Aug. 27, 2013

(54) COAXIAL LINE WITH SUPPORTING RINGS

(75) Inventors: Markus Leipold, Isen (DE); Werner Perndl, Vaterstetten (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 298 days.

(21) Appl. No.: 12/867,751

(22) PCT Filed: Feb. 12, 2009

(86) PCT No.: PCT/EP2009/000987
§ 371 (c)(1),
(2), (4) Date: Aug. 13, 2010

(87) PCT Pub. No.: WO2009/100906
PCT Pub. Date: Aug. 20, 2009

(65) Prior Publication Data

US 2010/0314167 A1 Dec. 16, 2010

(30) Foreign Application Priority Data

Feb. 15, 2008 (DE) ......................... 10 2008 009 309
Mar. 5, 2008 (DE) ......................... 10 2008 012 591

(51) Int. Cl.
*H02G 3/00* (2006.01)
*H01B 5/10* (2006.01)
*H01B 7/00* (2006.01)

(52) U.S. Cl.
USPC ............. 174/99 R; 174/97; 174/98; 174/131; 174/28

(58) Field of Classification Search
None
See application file for complete search history.

(56) References Cited

U.S. PATENT DOCUMENTS

| | | | | |
|---|---|---|---|---|
| 2,337,866 | A | 12/1943 | Boughton | |
| 2,437,482 | A | 3/1948 | Salisbury | |
| 2,510,358 | A | 6/1950 | Wolf | |
| 2,623,122 | A | 12/1952 | Weber | |
| 2,667,622 | A | 1/1954 | Weber | |
| 3,146,297 | A | 8/1964 | Hahne | |
| 3,433,883 | A | 3/1969 | Hahne | |
| 3,761,332 | A | 9/1973 | Jachimowicz | |
| 3,928,519 | A | 12/1975 | Kashiyama | |
| 4,011,118 | A | 3/1977 | Geominy | |
| 4,145,565 | A * | 3/1979 | Donon ............................ | 174/28 |

(Continued)

FOREIGN PATENT DOCUMENTS

| | | |
|---|---|---|
| DE | 1096441 B | 1/1961 |
| DE | 1490110 A1 | 7/1967 |

(Continued)

OTHER PUBLICATIONS

International Preliminary Report on Patentability mailed Dec. 9, 2010, in corresponding International Application No. PCT/EP2009/000987, filed Feb. 12, 2009, 5 pages.

(Continued)

*Primary Examiner* — Jayprakash N Gandhi
*Assistant Examiner* — Dion Ferguson
(74) *Attorney, Agent, or Firm* — Christensen O'Connor Johnson Kindness PLLC

(57) ABSTRACT

Within a coaxial line, the supporting rings are injection-molded directly onto the inner conductor using synthetic-material injection technology. Furthermore, a circumferential gluing groove, by means of which the supporting ring is glued in the outer conductor through the introduction of glue, is formed on the outer circumference of the supporting ring.

11 Claims, 1 Drawing Sheet

(56) References Cited

U.S. PATENT DOCUMENTS

| | | | | |
|---|---|---|---|---|
| 4,431,255 | A | 2/1984 | Banning | |
| 4,493,946 | A * | 1/1985 | Duret | 174/88 C |
| 4,718,864 | A | 1/1988 | Flanagan | |
| 4,906,207 | A * | 3/1990 | Banning et al. | 439/578 |
| 5,489,748 | A * | 2/1996 | Yee | 174/174 |
| 7,527,501 | B2 | 5/2009 | Kuroda | |
| 7,678,994 | B2 * | 3/2010 | Morand | 174/76 |
| 7,705,238 | B2 * | 4/2010 | Van Swearingen | 174/28 |
| 2007/0264872 | A1 | 11/2007 | Kuroda | |
| 2007/0267717 | A1 | 11/2007 | Van Swearingen | |

FOREIGN PATENT DOCUMENTS

| | | | |
|---|---|---|---|
| DE | 1490633 | A1 | 7/1969 |
| DE | 1590413 | A1 | 6/1970 |
| DE | 1640095 | A1 | 7/1970 |
| DE | 1554883 | A1 | 11/1971 |
| DE | 1540543 | A1 | 2/1972 |
| DE | 2134888 | A1 | 2/1973 |
| DE | 2338186 | A1 | 2/1974 |
| DE | 2417911 | A1 | 10/1974 |
| DE | 2522447 | A1 | 11/1975 |
| DE | 2735773 | A1 | 2/1978 |
| DE | 4107651 | A1 | 9/1992 |
| DE | 20104611 | U1 | 6/2001 |
| DE | 102006048467 | A1 | 9/2007 |
| GB | 1471768 | A | 4/1977 |
| GB | 2023912 | A | 1/1980 |

OTHER PUBLICATIONS

International Preliminary Report on Patentability, dated Apr. 30, 2010, issued in corresponding International Application No. PCT/EP2009/000987, filed Feb. 19, 2009.

International Search Report, mailed May 29, 2009, issued in corresponding International Application No. PCT/EP2009/000987, filed Feb. 19, 2009.

* cited by examiner

COAXIAL LINE WITH SUPPORTING RINGS

BACKGROUND

Conventional coaxial lines of the type set forth in US 2007/0264 872 A1, as they are used as rigid line connections in high-frequency technology, for example, for the connection of a coaxial jack or a coaxial socket to a high-frequency unit attached within a housing, have hitherto been plugged together from several individual parts. The inner conductor generally consists of several turned parts compressed or screwed together, between which supports made of insulating material manufactured in a material-removing manner are fitted. The fitting of this accordingly prefabricated inner-conductor-supporting-ring unit within the rigid outer conductor is, once again, implemented through several connected tubular parts plugged into one another, so that the edges of the supporting rings are clamped between annular contact surfaces of these tubular parts plugged into the outer conductor. This known manufacturing technology for rigid coaxial lines is very cost intensive. The smaller the dimensions of such coaxial lines, the more difficult an accurate manufacture using this manufacturing technology becomes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The object of the invention is therefore to provide a coaxial line of the type mentioned in the introduction, which can also be manufactured with small dimensions and high precision but in a simple and cost favourable manner.

This object is achieved on the basis of a coaxial line according to the preamble of claim 1 by its characterising features. Advantageous further developments also with regard to a particularly simple possibility for the insertion of the inner-conductor-supporting-ring unit into the outer conductor are specified in the dependent claims.

Through the direct injection moulding of the supporting rings onto the one-piece inner conductor using known micro-injection technology, the inner-conductor-supporting-ring unit can be manufactured with high precision and stability. With this manufacturing method, the supporting ring is attached to the inner conductor without tolerance air, additional assembly and adjustment operations are not required. Tolerance accumulations do not generally occur in the case of a one-piece realisation. The construction method according to the invention is particularly suitable for high-frequencies, at which the dimensions of such coaxial lines are becoming ever smaller.

A particularly simple and yet precise method of construction is achieved in the combination of an inner-conductor-supporting-ring unit of this kind manufactured using injection-moulding technology with a fitting according to the invention of this unit in the outer conductor according to dependent claim 5. Through this direct gluing of the supporting rings to the cylindrical internal wall of the outer conductor, a one-piece manufacture of the outer conductor is also possible, and the clamping technique using several components plugged one inside the other previously provided for the supporting attachment within the outer conductor is not required.

Moreover, an accurate adjustment of the inner-conductor-supporting-ring unit relative to the outer conductor is possible, that is to say, the plug gap S can be accurately adjusted.

However, this special gluing technique can be used not only for the fitting of an inner-conductor-supporting-ring unit according to claims 1 to 4 with supporting rings injected-moulded directly onto the inner conductor, but could also be used for such inner-conductor-supporting-ring units, in which the supporting rings are manufactured separately as turned parts and are clamped between inner-conductor pieces compressed together. In the case of the manufacture of the inner-conductor-supporting-ring unit according to this conventional manufacturing method, it is only necessary to provide corresponding gluing grooves on the circumference of the supporting rings manufactured separately as a turned part.

DESCRIPTION OF THE DRAWINGS

The invention is explained in greater detail below with reference to schematic drawings of exemplary embodiments. The drawings are as follows.

DETAILED DESCRIPTION

Figure 1:
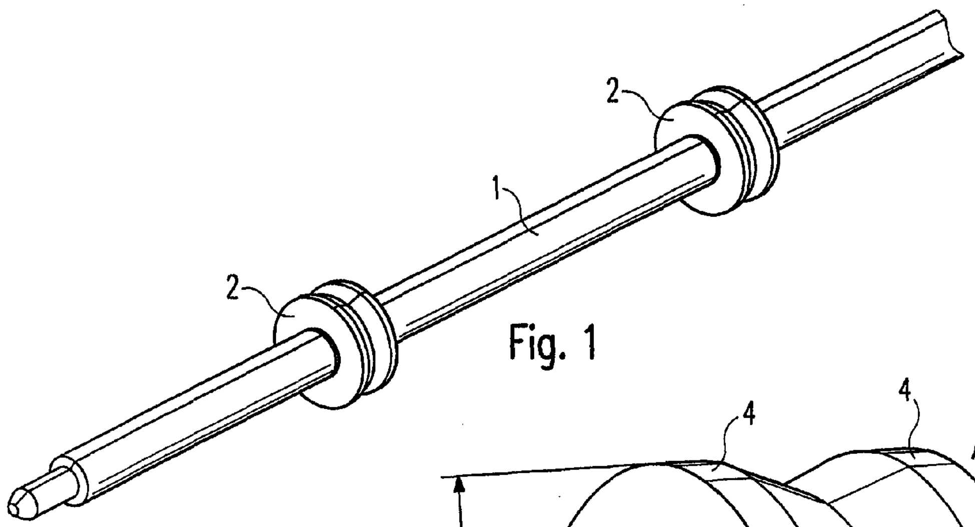
FIG. 1 shows in a perspective view and in a considerably enlarged scale, an inner-conductor-supporting-ring unit manufactured according to the invention with supporting rings injected moulded directly onto the inner conductor.

FIG. 1 shows an inner-conductor-supporting-ring unit manufactured according to the invention with a one-piece, continuous inner conductor 1, which is manufactured as a high-precision, one-piece turned part. The unit is presented in a considerably enlarged scale. For the realisation of a line with 50 Ohm surge impedance, the inner conductor 1 has a diameter of, for example, 0.804 mm with an outer-conductor diameter of 1.85 mm. In the exemplary embodiment presented, two supporting rings 2 are fitted at a spacing distance from one another on the inner conductor, dependent upon the length of the desired coaxial line, only a single supporting ring 2 is also often provided or, in the case of relatively longer lines, more than two supporting rings. At the fitting positions of supporting rings 2, flat recesses are formed on the inner conductor circumference, which provide a rectangular cross-section as shown in FIG. 2 and accordingly form a corresponding twist protection for the subsequently injected-moulded supporting ring 2.

Figure 2:
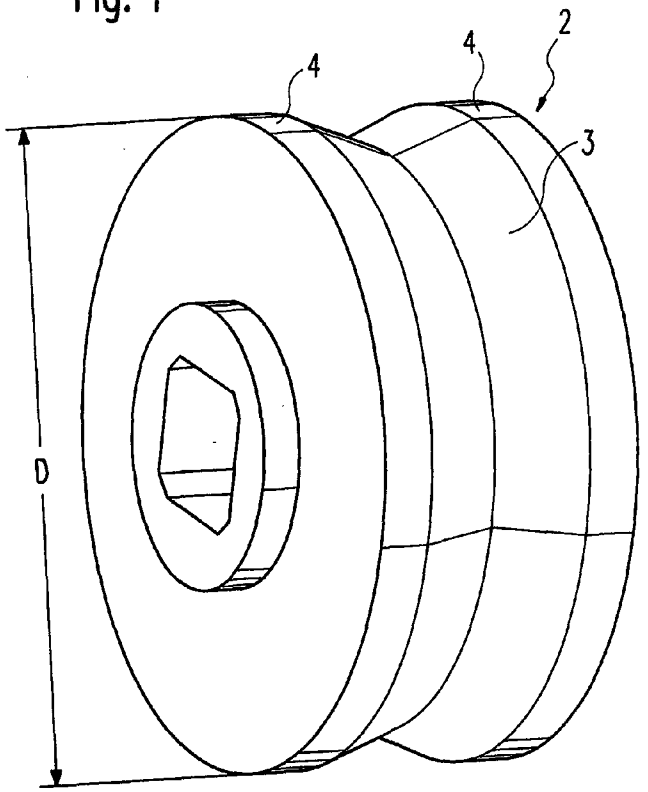
FIG. 2 shows in a considerably enlarged presentation, a supporting ring of this kind manufactured using micro-injection technology directly onto the inner conductor.

By placing an injection mould on the inner conductor at the required position of the supporting ring 2, the latter is injection moulded using a known micro-injection technology directly into the flat, turned groove with rectangular cross-section in the form presented in enlargement in FIG. 2. For this injection-moulding technique, a synthetic material with low dielectric constant is used, which, moreover, provides a low coefficient of expansion, is very structurally stable, provides high strength and can also be readily glued. For example, the synthetic material LCP (Liquid Crystal Polymer) is suitable for this purpose. In this manner, the supporting rings are injection moulded onto the inner conductor 1, so that the unit presented in FIG. 1, of which the supporting rings enclose the inner conductor without tolerance air, is finally formed.

Figure 3:
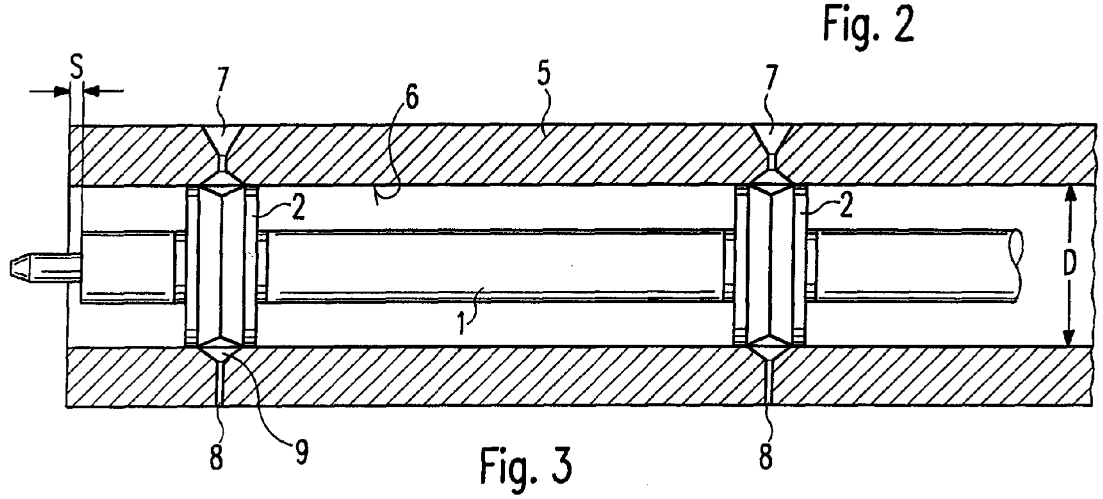
FIG. 3 shows the fitting of an inner-conductor-supporting-ring unit according to FIG. 1 within an outer conductor presented in cross-section.

On the outer circumference of the supporting ring 2, a V-shaped gluing groove 3 is formed, which is limited on both sides by annular sealing surfaces 4. This gluing groove 3 with the sealing surfaces 4 is also formed using micro-injection technology directly through a corresponding shape of the injection-moulding tool. This gluing groove 3 is used according to FIG. 3 for the direct gluing of the inner-conductor-supporting-ring unit within the outer conductor 5. This outer conductor 5 is formed as a rigid component with a continuous, cylindrical internal wall, of which the internal diameter D corresponds to the external diameter D of the supporting rings 2, so that, with the inner-conductor-supporting-ring unit inserted, the sealing surfaces 4 are in contact as closely as possible with the internal circumference 6 of the outer conductor. Additionally, a gluing groove 9 can also be provided on the internal circumference 6 of the outer conductor in the fitting region of the supporting rings 2.

In the fitting region of the supporting rings 2, funnel-shaped boreholes 7 and degassing boreholes 8 disposed diametrically opposite are formed within the outer conductor. After the insertion of the inner-conductor-supporting-ring unit within the outer conductor, an appropriate liquid glue is introduced via the funnel-shaped boreholes 7 into the gluing groove 3 of the supporting ring. This introduction is facilitated by the degassing apertures 8. As the glue, a glue with low dielectric constant is preferably used. When the gluing groove 3 has been completely filled with glue, a rigid, structurally stable attachment of the supporting rings 2 within the outer conductor is accordingly achieved.

The invention is not restricted to the exemplary embodiment presented. All of the features described and/or illustrated can be combined with one another as required within the framework of the invention.

The invention claimed is:

1. A coaxial line, comprising:

an outer conductor;

an inner conductor positioned within the outer conductor via at least one supporting ring made of insulating material, the at least one supporting ring being injection-molded directly onto the inner conductor;

a continuous gluing groove formed on the outer circumference of the supporting ring;

a funnel-shaped borehole disposed in fluid communication with the gluing groove of the supporting ring;

a gluing groove provided with the internal circumference of the outer conductor, which corresponds with the gluing groove of the supporting ring; and a glue having a dielectric constant being introduced into the gluing groove of the supporting ring at a fitting position of the supporting ring within the outer conductor, wherein the supporting ring is fixed to the inner circumference of the outer conductor by the glue introduced into the gluing groove of the supporting ring.

2. The coaxial line according to claim 1, wherein the inner conductor is manufactured as a continuous turned part with a flat turned groove at the supporting-ring fitting position.

3. The coaxial line according to claim 1, wherein the inner conductor provides a non-rotationally symmetrical cross-section at the supporting-ring fitting position acting as a twist protection.

4. The coaxial line according to claim 1, wherein several supporting rings are injection-molded onto the inner conductor with a spacing distance from one another.

5. The coaxial line according to claim 1, wherein the edges of the gluing groove of the supporting ring are formed as sealing surfaces contacting the cylindrical internal circumference of the outer conductor.

6. The coaxial line according to claim 1, wherein a degassing aperture is provided at the fitting position of the supporting ring within the outer conductor diametrically opposite to the funnel borehole.

7. The coaxial line according to claim 1, wherein:

several supporting rings are injection-molded onto the continuous inner conductor with a spacing distance from one another; and funnel-shaped boreholes and degassing boreholes are provided respectively for the supply of glue at each of the fitting positions of the supporting rings attached to the inner conductor with a spacing distance.

8. The coaxial line according to claim 1, wherein the supporting ring is injection-molded directly onto the inner conductor using a synthetic-material-injection process.

9. The coaxial line according to claim 1, wherein the outer conductor is a unitary member.

10. The coaxial line according to claim 1, wherein the gluing groove of the supporting ring is V-shaped.

11. A coaxial line, comprising:

an outer conductor having a cylindrical inner bore;

a gluing groove provided in the cylindrical inner bore of the outer conductor;

at least one supporting ring made of insulating material, the supporting ring having a continuous gluing groove formed on the outer circumference thereof, wherein the supporting ring is disposed within the cylindrical inner bore at a fitting position such that the continuous gluing groove of the support ring is aligned with the gluing groove of the outer conductor, and wherein the outer diameter of the supporting ring is substantially identical to the diameter of the cylindrical inner bore of the outer conductor;

an inner conductor positioned within the outer conductor via the at least one supporting ring, the at least one supporting ring being injection-molded directly onto the inner conductor;

a funnel-shaped borehole disposed in fluid communication with the gluing groove of the supporting ring; and a glue having a dielectric constant being introduced into the gluing groove of the supporting ring, wherein the glue fixedly secures the supporting ring to the outer conductor.

* * * * *